US009906520B2

(12) United States Patent
Fouad et al.

(10) Patent No.: US 9,906,520 B2
(45) Date of Patent: Feb. 27, 2018

(54) MULTI-USER AUTHENTICATION

(71) Applicant: International Business Machines Corporation, Armonk, NY (US)

(72) Inventors: Ahmed Fouad, Cairo (EG); Tamer A. Mahfouz, Cairo (EG); Nader M. Nassar, Yorktown Heights, NY (US); Tamer M. Nassar, Brookfield, CT (US); Alaa S. Youssef, Valhalla, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/957,107

(22) Filed: Dec. 2, 2015

(65) Prior Publication Data

US 2017/0163623 A1 Jun. 8, 2017

(51) Int. Cl.
*H04L 29/06* (2006.01)

(52) U.S. Cl.
CPC .......... *H04L 63/083* (2013.01); *H04L 63/102* (2013.01); *H04L 2463/082* (2013.01)

(58) Field of Classification Search
CPC .............................. H04L 63/083; H04L 63/102
USPC ...................................................... 726/1, 2, 4
See application file for complete search history.

(56) References Cited

U.S. PATENT DOCUMENTS

| | | | |
|---|---|---|---|
| 5,588,061 A | 12/1996 | Ganesan et al. | |
| 7,218,739 B2 | 5/2007 | Multerer et al. | |
| 7,373,515 B2 | 5/2008 | Owen | |
| 7,530,117 B2* | 5/2009 | Tanaka | G06F 21/121 726/31 |
| 7,882,549 B2 | 2/2011 | Edwards, Jr. et al. | |
| 8,006,291 B2 | 8/2011 | Headley et al. | |
| 8,266,694 B1 | 9/2012 | Roy | |
| 8,438,617 B2 | 5/2013 | Brainard et al. | |
| 8,522,024 B2 | 8/2013 | Lu et al. | |

(Continued)

FOREIGN PATENT DOCUMENTS

WO 2012170786 A1 12/2012

OTHER PUBLICATIONS

Distributed Learning Policies forPower Allocation in Multiple Access Channels, Mertikopoulos et al, IEEE, 2011, 10.1109/JSAC.2012.120109.*

(Continued)

*Primary Examiner* — Jahangir Kabir
(74) *Attorney, Agent, or Firm* — Maeve Carpenter

(57) ABSTRACT

In an approach to multi-user authentication, one or more computer processors receive a first user login. The one or more computer processors determine whether at least one additional user login is received. The one or more computer processors receive an access request from the first user. The one or more computer processors receive an access request from the at least one additional user. In response to receiving the access request from the first user and the access request from the at least one additional user, the one or more computer processors determine whether the access request from the first user and the access request from the at least one additional user meet pre-defined criteria. In response to determining the access requests meet pre-defined criteria, the one or more computer processors authorize the access request of the first user and the access request of the at least one additional user.

8 Claims, 3 Drawing Sheets

(56) References Cited

U.S. PATENT DOCUMENTS

| | | | |
|---|---|---|---|
| 8,806,205 B2 | 8/2014 | Metke et al. | |
| 8,875,243 B1* | 10/2014 | Cherukumudi | H04L 63/168 |
| | | | 713/168 |
| 9,059,985 B1* | 6/2015 | Treleaven | H04L 63/08 |
| 9,246,892 B2* | 1/2016 | Harrison | H04L 63/0492 |
| 9,288,202 B1* | 3/2016 | Felton | H04L 63/083 |
| 9,613,190 B2* | 4/2017 | Ford | G06F 21/10 |
| 2004/0127190 A1 | 7/2004 | Hansson | |
| 2006/0259949 A1 | 11/2006 | Schaefer | |
| 2007/0283411 A1 | 12/2007 | Paramasivam | |
| 2008/0086767 A1 | 4/2008 | Kulkarni et al. | |
| 2008/0184336 A1 | 7/2008 | Sarukkai | |
| 2010/0064341 A1 | 3/2010 | Aldera | |
| 2010/0107216 A1 | 4/2010 | Tobe | |
| 2010/0306824 A1* | 12/2010 | Gurney | G06F 21/6245 |
| | | | 726/4 |
| 2011/0154210 A1 | 6/2011 | Sung | |
| 2013/0052990 A1* | 2/2013 | Zhang | H04L 63/20 |
| | | | 455/411 |
| 2013/0247156 A1* | 9/2013 | Savo | G06F 21/31 |
| | | | 726/4 |
| 2014/0053256 A1 | 2/2014 | Soffer et al. | |
| 2014/0150072 A1 | 5/2014 | Castro et al. | |
| 2014/0172704 A1 | 6/2014 | Atagun et al. | |
| 2014/0215551 A1 | 7/2014 | Allain et al. | |
| 2015/0106897 A1* | 4/2015 | Davis | H04L 63/083 |
| | | | 726/7 |
| 2015/0163206 A1* | 6/2015 | McCarthy | G06F 21/6227 |
| | | | 713/171 |
| 2015/0172929 A1* | 6/2015 | Tipton | H04W 12/08 |
| | | | 455/411 |
| 2015/0229539 A1 | 8/2015 | Burke | |

OTHER PUBLICATIONS

Location-based request forwarding in a geo-fencing application with multiple providers, Dirgahayu et al, IEEE, Sep. 2015, 10.1109/TIME-E.2015.7389754.*

Castro et al., "Runtime adaptive multi-factor authentication for mobile devices", IBM J. RES. & DEV. ,Vol. 57, No. 6, PAPER 8, Nov./Dec. 2013, © Copyright 2013 by International Business Machines Corporation, pp. 1-17.

Liu et al., "The Research of a Multi-Factor Dynamic Authorization Model", Ninth IEEE International Conference on e-Business Engineering, © 2012 IEEE, pp. 201-205.

U.S. Appl. No. 15/012,469, filed Feb. 1, 2016.

List of IBM Patents or Patent Applications Treated as Related (Appendix P), filed herewith.

* cited by examiner

MULTI-USER AUTHENTICATION

BACKGROUND OF THE INVENTION

The present invention relates generally to the field of information security technology, and more particularly to multi-user authentication.

Present-day commerce increasingly relies on electronic transactions, and as such, a party to a proposed transaction needs to be able to verify that the other parties to the proposed transaction are legitimate. Illegitimate other parties include, but are not limited to, hackers, those interested in perpetrating identity theft, and those interested in perpetrating fraud. Authentication is the process of determining that an authorized user has initiated a request and that the request was not modified improperly by an interloper on the way to the destination. Accordingly, various authentication methodologies have been developed to verify a party's identity prior to an electronic transaction. Unfortunately, many authentication methods have weaknesses that can be exploited or that introduce burdens on users and managing organizations.

Multi-factor authentication of a single user takes advantage of a combination of two or more factors of authentication. Three major factors include: verification by something the user knows, such as a password, or a personal identification number (PIN); something the user has, such as a smart card, a security fob, a hardware or virtual token, or a digital certificate; and something the user is, such as a biometric characteristic, e.g., a fingerprint, a facial image, a retinal pattern, a voiceprint, etc. Due to its increased complexity, a multi-factor authentication is harder to compromise than a single factor authentication.

Multi-user authentication is a requirement that two or more users are authenticated at the same time. A system will wait for the two or more users to provide permission to a given action on a given resource, and only when all required permissions are provided will the system perform the action. For example, regarding session management, for a session to be valid, two or more authorized users have to be authenticated. If one user is authenticated, the session will not be valid and active until at least one other authorized user is also authenticated. In another example, regarding request processing, a request must be received from two or more authorized users in order to proceed with processing the request.

SUMMARY

Embodiments of the present invention disclose a method, a computer program product, and a system for multi-user authentication. The method may include one or more computer processors receiving a first user login. The one or more computer processors determine whether at least one additional user login is received. In response to determining at least one additional user login is received, the one or more computer processors receive an access request from the first user. The one or more computer processors receive an access request from the at least one additional user. In response to receiving the access request from the first user and the access request from the at least one additional user, the one or more computer processors determine whether the access request from the first user and the access request from the at least one additional user meet pre-defined criteria. In response to determining the access requests meet pre-defined criteria, the one or more computer processors authorize the access request of the first user and the access request of the at least one additional user.

DETAILED DESCRIPTION

User authentication is often the method of choice for online protection and applied security, regardless of what is being protected. Protected resources may include a user profile, a bank account, or any type of privileged data such as code, documentation, media, etc. Graded trust and multi-factor authentication are also common means of security. However in some instances, resources are so privileged that one user access or multi-factor authentication is not secure enough, and multi-user authentication is required, i.e., multiple users are required to sign in simultaneously, i.e., within a pre-defined duration of time, in order to gain access to the resources. Embodiments of the present invention recognize that online security of privileged resources may be improved by preventing a privileged action from being performed unless a specific number of users are simultaneously online, authenticated, and approving of applying the privileged action on the resource. Implementation of embodiments of the invention may take a variety of forms, and exemplary implementation details are discussed subsequently with reference to the Figures.

Figure 1:
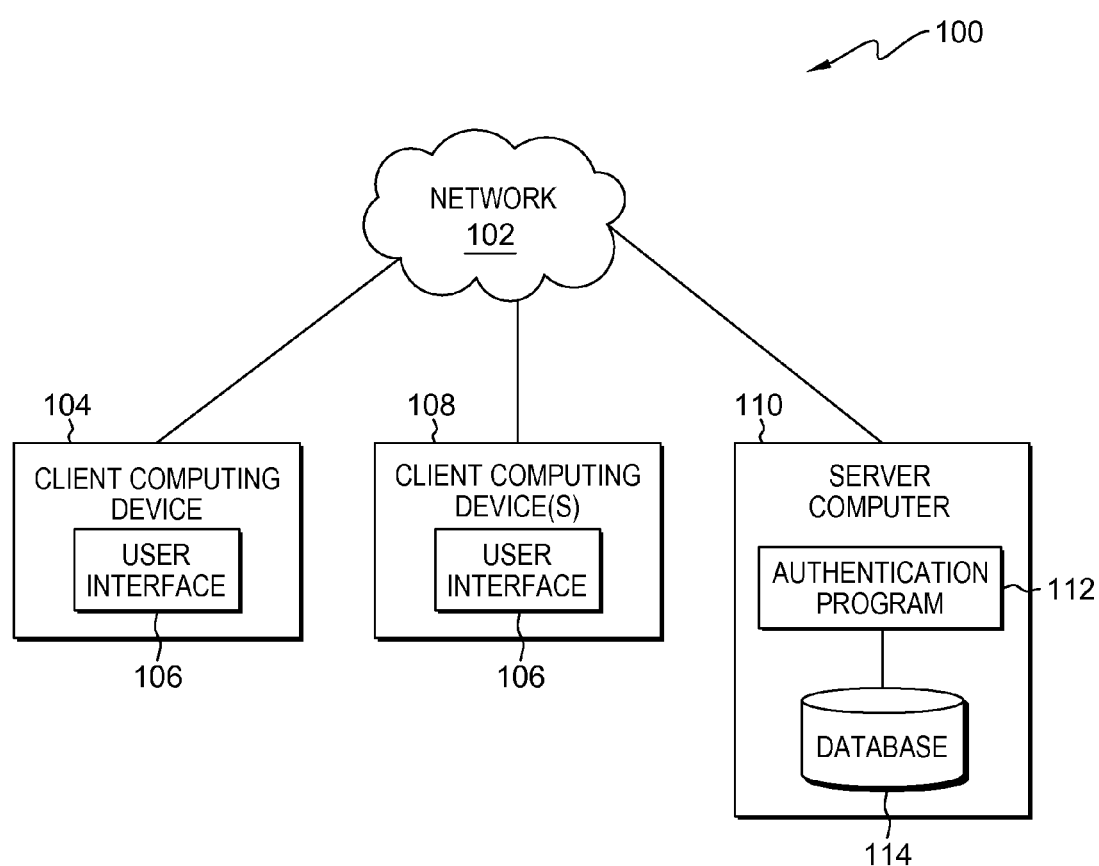
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes client computing device 104, client computing device(s) 108, and server computer 110, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between client computing device 104, client computing device(s) 108, server computer 110, and other computing devices (not shown) within distributed data processing environment 100.

Client computing device 104 and client computing device(s) 108 can each be at least one of a laptop computer, a tablet computer, a smart phone, or any programmable electronic device capable of communicating with various components and devices within distributed data processing environment 100, via network 102. In general, client computing device 104 and client computing device(s) 108 represent any programmable electronic device or combination of programmable electronic devices capable of executing machine readable program instructions and communicating with other computing devices (not shown) within distributed data processing environment 100 via a network, such as network 102. Client computing device 104 and client computing device(s) 108 each include an instance of user interface 106.

User interface 106 provides an interface between a user of client computing device 104 and client computing device(s) 108 and server computer 110. In one embodiment, user interface 106 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 106 may also be mobile application software that provides an interface between a user of client computing device 104 and client computing device(s) 108 and server computer 110. Mobile application software, or an "app," is a computer program designed to run on smart phones, tablet computers and other mobile devices. User interface 106 enables client computing device 104 and client computing device(s) 108 to provide a connection with server computer 110 to authenticate a user prior to enabling a multi-user access or transaction via authentication program 112.

Server computer 110 can be a standalone computing device, a management server, a web server, a mobile computing device, or any other electronic device or computing system capable of receiving, sending, and processing data. In other embodiments, server computer 110 can represent a server computing system utilizing multiple computers as a server system, such as in a cloud computing environment. In another embodiment, server computer 110 can be a laptop computer, a tablet computer, a netbook computer, a personal computer (PC), a desktop computer, a personal digital assistant (PDA), a smart phone, or any programmable electronic device capable of communicating with client computing device 104, client computing device(s) 108, and other computing devices (not shown) within distributed data processing environment 100 via network 102. In another embodiment, server computer 110 represents a computing system utilizing clustered computers and components (e.g., database server computers, application server computers, etc.) that act as a single pool of seamless resources when accessed within distributed data processing environment 100. Server computer 110 includes authentication program 112 and database 114. Server computer 110 may include internal and external hardware components, as depicted and described in further detail with respect to FIG. 3.

Authentication program 112 enables multi-user authentication for performing privileged actions on a shared resource. Authentication program 112 provides access to a shared, privileged resource by confirming simultaneous authentication of two or more users on the shared resource, i.e., authentication of two or more users within a pre-defined duration of time, and preventing access to the resource by a single user login. Authentication program 112 also confirms that the two or more authenticated users request the same access or action before authorizing the access or action. In one embodiment, authentication program 112 is a standalone program. In another embodiment, authentication program 112 may be integrated into the privileged resource. Authentication program 112 is depicted and described in further detail with respect to FIG. 2.

In the depicted embodiment, database 114 resides on server computer 110. In another embodiment, database 114 may reside elsewhere within distributed data processing environment 100 provided authentication program 112 has access to database 114. A database is an organized collection of data. Database 114 can be implemented with any type of storage device capable of storing data and configuration files that can be accessed and utilized by server computer 110, such as a database server, a hard disk drive, or a flash memory. Database 114 stores pre-defined authentication information for the users of client computing device 104 and client computing device(s) 108. Database 114 may also store pre-defined criteria, such as one or more rules or policies, with which authentication program 112 determines whether or not to authorize a requested transaction.

Figure 2:
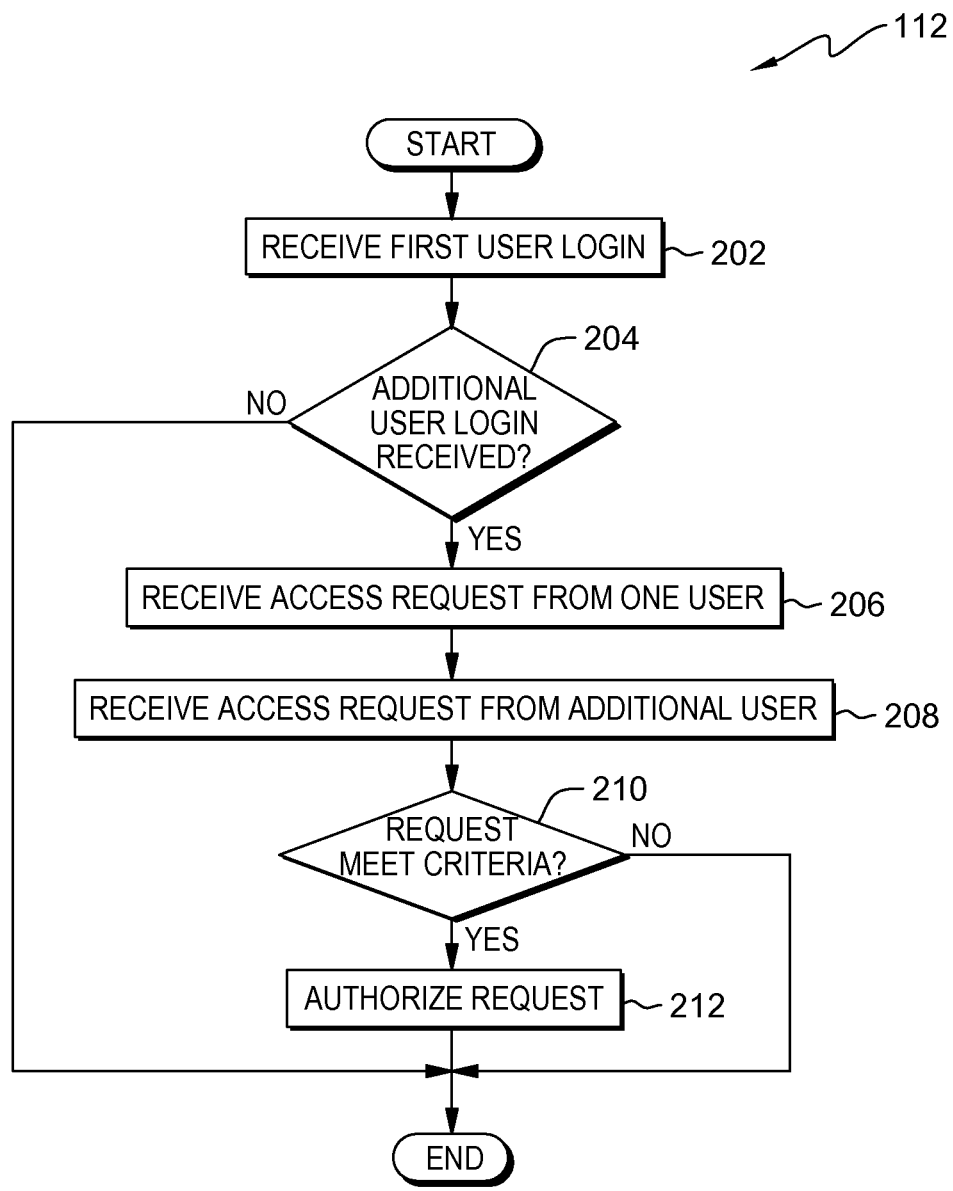
FIG. 2 is a flowchart depicting operational steps of an authentication program, on a server computer within the distributed data processing environment of FIG. 1, for authenticating multiple users to perform a privileged action on a shared resource, in accordance with an embodiment of the present invention.

FIG. 2 is a flowchart depicting operational steps of authentication program 112, on server computer 110 within distributed data processing environment 100 of FIG. 1, for authenticating multiple users to perform a privileged action on a shared resource, in accordance with an embodiment of the present invention.

Authentication program 112 receives a first user login (step 202). In an effort to request access to a privileged resource, a user of client computing device 104 logs in to the resource by entering the required credentials via user interface 106. The credentials may include one or more of a plurality of authentication types, as would be recognized by one skilled in the art. For example, the credentials may be a user id and a password, a personal identification number (PIN), or a biometric characteristic such as a fingerprint. Authentication program 112 receives the first user login either as a standalone protection layer to the resource or as an integrated protection layer within the resource.

Authentication program 112 determines whether an additional user login is received (decision block 204). Due to the nature of the privileged resource, and pre-defined rules or policies, stored in database 114, regarding the resource, authentication program 112 recognizes that at least one additional user login is required to proceed with access to the resource. One or more users of client computing device(s) 108 may log in to the resource by entering the required credentials via user interface 106, as discussed with respect to step 202. In an embodiment where only one additional user login is required, authentication program 112 determines whether one additional user login is received. In an embodiment where multiple additional user logins are required, authentication program 112 determines whether the required number of user logins are received. In one embodiment, authentication program 112 compares the user's login credentials to pre-defined user authorizations stored in database 114 to determine whether the additional user is authorized to confirm an access request from the first user. In one embodiment, authentication program 112 determines whether an additional user login is received within a pre-defined threshold duration of time as an act of simultaneous authentication, otherwise the session is invalid. For example, the additional user has to log in within five minutes after the first user logged in. In one embodiment, authentication program 112 may diversify the authentication method for each user i.e., authentication program 112 may employ one or more of a multi-factor authentication method for one user and a different one or more multi-factor authentication method for a second user. For example, authentication program 112 may require one user to enter a password while the other user uses a biometric characteristic, such as a fingerprint. If authentication program 112 determines an additional user login is not received ("no" branch, decision block 204), then authentication program 112 ends. In one embodiment, authentication program 112 notifies the first user, via user interface 106, that the session is invalid because a second user either did not login successfully or did not login within an allotted time threshold.

If authentication program 112 determines an additional user login is received ("yes" branch, decision block 204), then authentication program 112 receives an access request from one user (step 206). An access request includes a request to access an account or data, a request to perform an action or transaction, or a request to grant permission for access or to perform an action or transaction. For example, the access request may be to transfer money from one bank account to another bank account. In another example, the access request may be to view confidential personnel records. Authentication program 112 receives an access request from one of the one or more users from whom authentication program 112 received a login, via user interface 106. In one embodiment, authentication program 112 confirms a geographic origin of the access request in addition to the user authentication. For example, a rule or policy may exist in database 114 that defines specific coordinates for a geographic location or a geographic radius around the privileged resource within which users must be located to gain access. In another example, a rule or policy may exist in database 114 that defines a geographic distance by which the users must be separated to gain access. Authentication program 112 may determine a user's location via a plurality of techniques know in the art, for example, via a global positioning system (GPS) included in client computing device 104 and client computing device(s) 108.

Authentication program 112 receives an access request from the additional user (step 208). Authentication program 112 receives an access request from the one or more additional users from whom authentication program 112 received a login, via user interface 106.

Responsive to receiving an access request from two or more users, authentication program 112 determines whether the access requests meet pre-defined criteria (decision block 210). Authentication program 112 confirms that the two or more users' requests meet the criteria stored in database 114. An example of a pre-defined criteria is a request for the same access or transaction. For example, if the first user requests to transfer $10,000 from joint bank account 1 to joint bank account 2, then authentication program 112 determines whether the one or more additional users make the same request. In another example, if a human resources employee requests access to edit a highly classified personnel document, then authentication program 112 determines whether the second authenticated user requests access to edit the same document. In an embodiment, the pre-defined criteria may also include a pre-defined duration of time in which the access requests must be received. In a further embodiment, the pre-defined criteria may also include a requirement that the access requests are directed toward the same resource, such as when a second user authorizes the access request of the first user. For example, if a human resources employee requests access to edit a highly classified personnel document, then authentication program 112 determines whether the second authenticated user authorizes the first user to access and edit the document. In one embodiment, the number of users needed to make the request may depend on the level of access requested. For example, the amount of money a user may request to transfer can depend on the number of users authenticated. A user may request to transfer $10,000 with one additional user authenticated, but may need a second additional user authenticated to request to transfer $1,000,000. In another example, accessing a shared document can have permissions to read, update, or delete, where having read access can be valid for two authenticated users, while update access may only be valid when four users are authenticated, and delete access may only be valid when six users are authenticated.

If authentication program 112 determines the access requests meet the pre-defined criteria ("yes" branch, decision block 210), then authentication program 112 authorizes the request (step 212). In an embodiment where authentication program 112 is a standalone program, authentication program 112 authorizes the request and conveys the authorization to the shared, privileged resource such that the resource, or an entity in control of the resource, can execute the request. In an embodiment where authentication program 112 is integrated into the shared, privileged resource, authentication program 112 may execute the request immediately.

If authentication program 112 determines the access requests do not meet the pre-defined criteria ("no" branch, decision block 210), then authentication program 112 ends. In one embodiment, authentication program 112 notifies the users, via user interface 106, that the access requests are not the same and access is denied.

In one embodiment, authentication program 112 begins by receiving a login and access request from two or more users. In response to receiving the logins and access requests, authentication program 112 authenticates the two or more users. Authentication program 112 determines the criteria required to authorize the access request. For example, authentication program 112 determines the number of users required and which users are authorized. Authentication program 112 determines whether the criteria are met. If authentication program 112 determines the criteria are met, then authentication program 112 authorizes the access request. If authentication program 112 determines the criteria are not met, then authentication program 112 may wait for a pre-defined duration threshold to determine if additional, required credentials are received in order to meet the criteria. If authentication program 112 does not receive additional, required credentials within the pre-defined duration threshold, then authentication program 112 does not authorize the access request. In one embodiment, if authentication program 112 does not authorize the access request, then authentication program 112 sends a message to the one or more logged in users that the request has failed.

Figure 3:
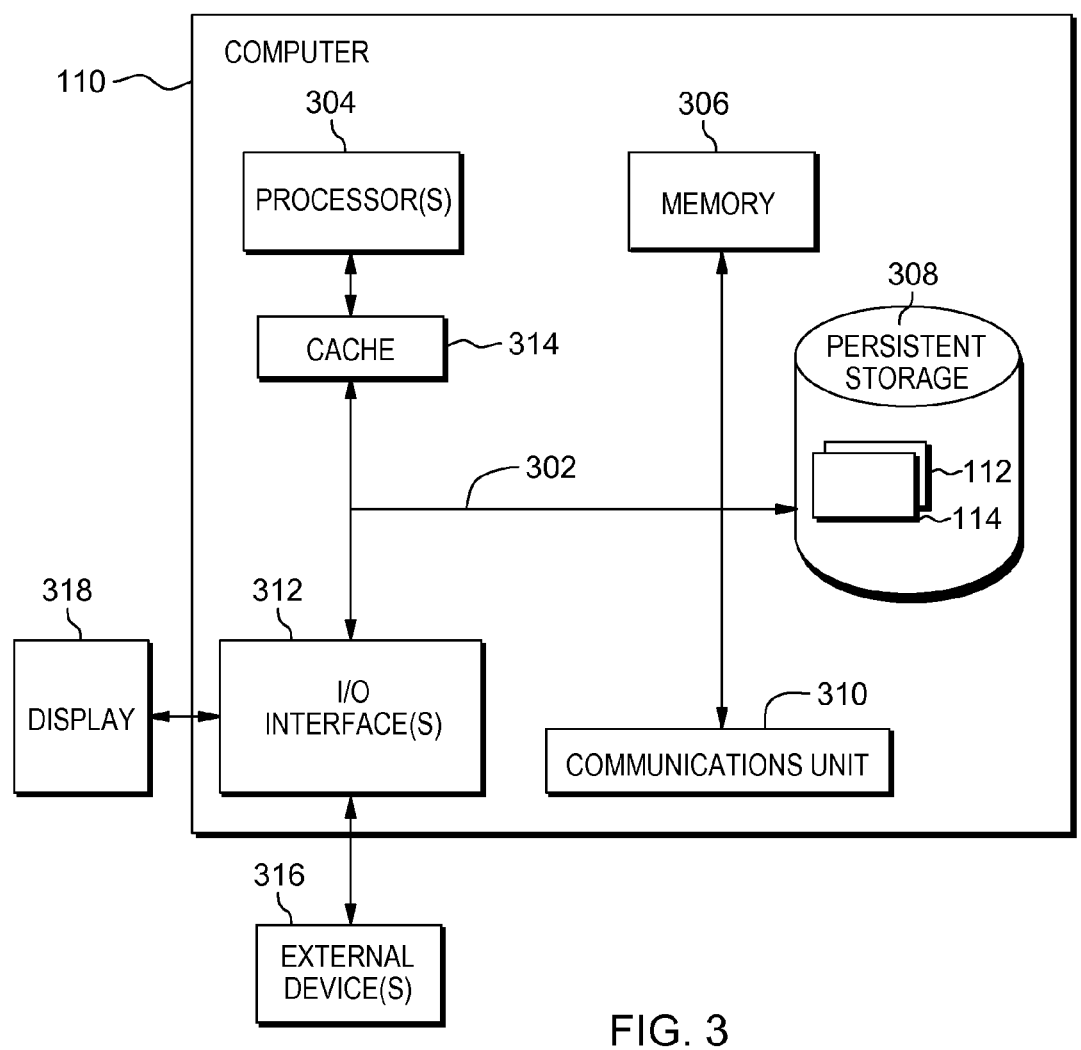
FIG. 3 depicts a block diagram of components of the server computer executing the authentication program within the distributed data processing environment of FIG. 1, in accordance with an embodiment of the present invention.

FIG. 3 depicts a block diagram of components of server computer 110 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Server computer 110 can include processor(s) 304, cache 314, memory 306, persistent storage 308, communications unit 310, input/output (I/O) interface(s) 312 and communications fabric 302. Communications fabric 302 provides communications between cache 314, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM). In general, memory 306 can include any suitable volatile or non-volatile computer readable storage media. Cache 314 is a fast memory that enhances the performance of processor(s) 304 by holding recently accessed data, and data near recently accessed data, from memory 306.

Program instructions and data used to practice embodiments of the present invention, e.g., authentication program 112 and database 114 are stored in persistent storage 308 for execution and/or access by one or more of the respective processor(s) 304 of server computer 110 via cache 314. In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of client computing device 104 and client computing device(s) 108. In these examples, communications unit 310 includes one or more network interface cards. Communications unit 310 may provide communications through the use of either or both physical and wireless communications links. Authentication program 112 and database 114 may be downloaded to persistent storage 308 of server computer 110 through communications unit 310.

I/O interface(s) 312 allows for input and output of data with other devices that may be connected to server computer 110. For example, I/O interface(s) 312 may provide a connection to external device(s) 316 such as a keyboard, a keypad, a touch screen, a microphone, a digital camera, and/or some other suitable input device. External device(s) 316 can also include portable computer readable storage media such as, for example, thumb drives, portable optical or magnetic disks, and memory cards. Software and data used to practice embodiments of the present invention, e.g., authentication program 112 and database 114 on server computer 110, can be stored on such portable computer readable storage media and can be loaded onto persistent storage 308 via I/O interface(s) 312. I/O interface(s) 312 also connect to a display 318.

Display 318 provides a mechanism to display data to a user and may be, for example, a computer monitor. Display 318 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for multi-user authentication, the method comprising:

receiving, by one or more computer processors, a first user login;

determining, by the one or more computer processors, whether at least one additional user login is received, wherein the first user login and the at least one additional user login employ one or more of a multi-factor authentication, and wherein the first user login utilizes a biometric characteristic and the at least one additional user login utilizes a password;

responsive to determining at least one additional user login is received, receiving, by the one or more computer processors, a first access request to a resource from the first user;

receiving, by the one or more computer processors, a second access request to the resource from the at least one additional user;

responsive to receiving the first access request from the first user and the second access request from the at least one additional user, determining, by the one or more computer processors, whether the first user and the at least one additional user are authorized to make the access requests, wherein determining whether the first user and the at least one additional user are authorized includes determining whether the first user and the at least one additional user are located within a pre-defined geographic radius around the resource;

responsive to receiving the first access request from the first user and the second access request from the at least one additional user, determining, by the one or more computer processors, whether the first access request from the first user and the second access request from the at least one additional user are received as a simultaneous authentication within the pre-defined geographic radius around the resource and within a pre-defined threshold duration of time; and responsive to determining the access requests are received as a simultaneous authentication within the pre-defined geographic radius around the resource and within a pre-defined threshold duration of time, authorizing, by the one or more computer processors, the first access request of the first user and the second access request of the at least one additional user.

2. The method of claim 1, wherein a number of user logins required is based, at least in part, on a level of pre-defined criteria.

3. The method of claim 1, wherein an access request includes at least one of: a request for access, a request to perform an action, a request to perform a transaction, a request to grant permission to perform an action, a request to grant permission for access, or a request to grant permission to perform a transaction.

4. A computer program product for multi-user authentication, the computer program product comprising:
one or more computer readable storage device and program instructions stored on the one or more computer readable storage device, the stored program instructions comprising:
program instructions to receive a first user login;
program instructions to determine whether at least one additional user login is received, wherein the first user login and the at least one additional user login employ one or more of a multi-factor authentication, and wherein the first user login utilizes a biometric characteristic and the at least one additional user login utilizes a password;
responsive to determining at least one additional user login is received, program instructions to receive a first access request to a resource from the first user;
program instructions to receive a second access request to the resource from the at least one additional user;
responsive to receiving the first access request from the first user and the second access request from the at least one additional user, program instructions to determine whether the first user and the at least one additional user are authorized to make the access requests, wherein determining whether the first user and the at least one additional user are authorized includes determining whether the first user and the at least one additional user are located within a pre-defined geographic radius around the resource;
responsive to receiving the first access request from the first user and the second access request from the at least one additional user, program instructions to determine whether the first access request from the first user and the second access request from the at least one additional user are received as a simultaneous authentication within the pre-defined geographic radius around the resource and within a pre-defined threshold duration of time; and
responsive to determining the access requests are received as a simultaneous authentication within the pre-defined geographic radius around the resource and within a pre-defined threshold duration of time, program instructions to authorize the first access request of the first user and the second access request of the at least one additional user.

5. The computer program product of claim 4, wherein a number of user logins required is based, at least in part, on a level of pre-defined criteria.

6. The computer program product of claim 4, wherein an access request includes at least one of: a request for access, a request to perform an action, a request to perform a transaction, a request to grant permission to perform an action, a request to grant permission for access, or a request to grant permission to perform a transaction.

7. A computer system for multi-user authentication, the computer system comprising:
one or more computer processors;
one or more computer readable storage device;
program instructions stored on the one or more computer readable storage device for execution by at least one of the one or more computer processors, the stored program instructions comprising:
program instructions to receive a first user login;
program instructions to determine whether at least one additional user login is received, wherein the first user login and the at least one additional user login employ one or more of a multi-factor authentication, and wherein the first user login utilizes a biometric characteristic and the at least one additional user login utilizes a password;
responsive to determining at least one additional user login is received, program instructions to receive a first access request to a resource from the first user;
program instructions to receive a second access request to the resource from the at least one additional user;
responsive to receiving the first access request from the first user and the second access request from the at least one additional user, program instructions to determine whether the first user and the at least one additional user are authorized to make the access requests, wherein determining whether the first user and the at least one additional user are authorized includes determining whether the first user and the at least one additional user are located within a pre-defined geographic radius around the resource;
responsive to receiving the first access request from the first user and the second access request from the at least one additional user, program instructions to determine whether the first access request from the first user and the second access request from the at least one additional user are received as a simultaneous authentication within the pre-defined geographic radius around the resource and within a pre-defined threshold duration of time; and
responsive to determining the access requests are received as a simultaneous authentication within the pre-defined geographic radius around the resource and within a pre-defined threshold duration of time, program instructions to authorize the first access request of the first user and the second access request of the at least one additional user.

8. The computer system of claim 7, wherein an access request includes at least one of: a request for access, a request to perform an action, a request to perform a transaction, a request to grant permission to perform an action, a request to grant permission for access, or a request to grant permission to perform a transaction.

* * * * *